United States Patent
Rubinstein et al.

(10) Patent No.: US 7,188,263 B1
(45) Date of Patent: Mar. 6, 2007

(54) METHOD AND APPARATUS FOR CONTROLLING POWER STATE OF A MULTI-LANE SERIAL BUS LINK HAVING A PLURALITY OF STATE TRANSITION DETECTORS WHEREIN POWERING DOWN ALL THE STATE TRANSITION DETECTORS EXCEPT ONE

(75) Inventors: Oren Rubinstein, Sunnyvale, CA (US); William B. Simms, San Jose, CA (US); Michael B. Diamond, Los Gatos, CA (US)

(73) Assignee: NVIDIA Corporation, Santa Clara, CA (US)

( * ) Notice: Subject to any disclaimer, the term of this patent is extended or adjusted under 35 U.S.C. 154(b) by 646 days.

(21) Appl. No.: 10/431,989

(22) Filed: May 7, 2003

(51) Int. Cl.
*G06F 1/00* (2006.01)
*G06F 1/32* (2006.01)
(52) U.S. Cl. .......................... 713/300; 713/320; 716/1
(58) Field of Classification Search ................ 713/300, 713/320, 322, 323, 324; 365/226, 227, 230.06; 323/33; 716/1, 2, 3
See application file for complete search history.

(56) References Cited

U.S. PATENT DOCUMENTS

| | | | |
|---|---|---|---|
| 6,079,024 A * | 6/2000 | Hadjimohammadi et al. | 713/322 |
| 6,529,438 B1 * | 3/2003 | Suzuki et al. | 365/230.06 |
| 6,816,994 B2 * | 11/2004 | Schoenfeld et al. | 716/1 |
| 6,907,534 B2 * | 6/2005 | Ku | 713/320 |

OTHER PUBLICATIONS

Kwa et al, PCI Express Architecture Power Management, Nov. 8, 2002, Intel, pp. 14.*

* cited by examiner

*Primary Examiner*—Chun Cao
*Assistant Examiner*—Suresh K Suryawanshi
(74) *Attorney, Agent, or Firm*—Cooley Godward Kronish, LLP

(57) ABSTRACT

An arrangement provides for further power reduction where a system includes two or more electrical components that can be placed into two or more power consumption states. The arrangement can take advantage of existing circuitry to selectively disable certain state transition detectors to thereby provide additional power reduction.

17 Claims, 6 Drawing Sheets

| L-State | Description | Used by S/W Directed PM | Used by ASPM | Platform Reference Clocks | Platform Main Power |
|---|---|---|---|---|---|
| L0 | Fully active link | Yes (D0) | Yes (D0) | On | On |
| L0s | Standby State | No | Yes [1] (D0) | On | On |
| L1 | Lower Power standby | Yes (D1-D3$_{hot}$) | Yes [2] (opt., D0) | On | On |

Fig. 3

METHOD AND APPARATUS FOR CONTROLLING POWER STATE OF A MULTI-LANE SERIAL BUS LINK HAVING A PLURALITY OF STATE TRANSITION DETECTORS WHEREIN POWERING DOWN ALL THE STATE TRANSITION DETECTORS EXCEPT ONE

BACKGROUND

The present invention is directed to a method and apparatus for power management of electrical components. More specifically, the present invention concerns an arrangement for managing power consumption of multiple components concurrently.

There are many environments in which management of power consumption of electrical components is important. In one such example, where electrical components, such as laptops or other mobile communication devices, are powered by batteries, designers attempt to reduce the power consumption of various electrical components. This reduces the cooling requirements for the device. This also prolongs the lifetime of the battery in question or in the case of rechargeable batteries extends time between charges.

In many of these environments that call for attention to power consumption, the electrical components are capable of being directed to various power consumption states. For example, an electrical component while in use may be designated as active and thereby be in a first power consumption state. It is also possible that while that electrical component is not being utilized but is in a state waiting for utilization, sometimes referred to as an idle state, the device can be operated in a reduced power mode when compared to the first power state. This second power state is utilized rather than simply turning off power to the device altogether so that there is a reduced latency in reactivating the device in use in the particular circuit in which it is employed.

In addition such devices usually include some circuitry or mechanism for detecting when it is necessary to transition to an active state. Thus, even in a reduced power mode there can be a significant consumption of power. Some systems or devices include multiple electrical components more than one of which are inactive or in some form of an idle state at the same time. Many times the plurality of electrical components all need to be activated at or around the same time to participate in the performance of some operation or function. Thus it is anticipated in that scenario that the multiple electrical components which reside in an idle or inactive state are all expecting to be reactivated by the occurrence of a single event or a number of related events. Thus in some configurations where there are multiple electrical components operating in an idle or inactive state a significant amount of power is consumed as the components operate to detect the trigger to change power states. This active detection operation keeps the latency period, that is the time period for going from low power to active state, short. It would be beneficial in this environment if it was possible to further reduce power consumption, particularly in the mobile/battery operated environment to thereby preserve the lifetime of the battery charge.

SUMMARY OF THE INVENTION

The present invention is directed to an arrangement by which power consumption amongst a plurality of electrical components can be further reduced. In particular, in connection with an arrangement where multiple electrical components can assume a plurality of different power states, for example, active, low power, etc., where multiple ones of those electrical components are placed in a lower power state and where such components are all awaiting the occurrence of a particular trigger event to cause a transition to a higher power consumption state, it is possible to use one of that plurality of electrical components as an initial detection device while disabling the trigger detection devices in the other electrical components. In that circumstance when the electrical component with the still enabled detection device detects the triggering event, it enables the corresponding detectors in the other electrical components so that they can each then recognize the triggering event and begin their respective transitions to a higher level power state. This arrangement can reduce power consumption because the disabling of the detection circuitry and the various ones of the electrical components results in a further reduction of power consumption in those components.

A BRIEF DESCRIPTION OF THE DRAWINGS

FIG. 3 is a table describing a subset of power states for elements of FIG. 1.

DETAILED DESCRIPTION

In an arrangement in which there are a plurality of electrical components, it is sometimes desirable to provide the capability of placing the components in various power consumptive states. In such a circumstance, the electrical components may be at times in an active mode when performing certain functionality and may be in an inactive or idle mode when awaiting either information to process or some command to execute or perform. In many circumstances the components are arranged to consume less power in the inactive or idle mode then when in the active mode. Depending on the level of inactivity the device could be placed into different reduced power consumptive states. However, in many circumstances it is necessary for the electrical component to be able to detect when it is necessary to transition back from a particular inactive mode to an active mode. To be able to detect a triggering event which would cause this reactivation of the electrical component, typically the electrical component has certain detection circuitry that is activated and consumes power.

A further reduction in power consumption can be achieved in such a system by using the present invention. In particular, power consumption can be reduced in such a system by providing that where two or more of the electrical components are to be placed in a low power state and they are awaiting receipt of the same or similar triggering information so as to reactivate them to an active state, it is possible to use or enable only the detection circuitry of one of the multiple electrical components while disabling the trigger detecting circuitry in the other electrical components. Then, when the enabled detector actually detects the occurrence of the triggering event, it could change the state of the detection circuitry in the other electrical components, enabling those components to detect the existence of the triggering event and thereby allow those electrical components to begin a transition to an active state from the inactive state.

An embodiment of the present invention will be described in connection with the operation of a high speed serial bus referred to as PCI Express™. While the remainder of this specification will provide particular details as to how the invention can be employed in the PCI Express™ architecture, it is noted that this is simply one instantiation of the invention of providing for further power control in a multi-component environment. It is possible therefore that similar principles can be applied in, for instance, other serial bus architectures where there are a plurality of components which might be placed in various power consumptive states. Furthermore, such power control capabilities could be employed in other arrangements such as a networked system that uses a conglomeration of single or multi-lane bus interconnections.

Figure 1:
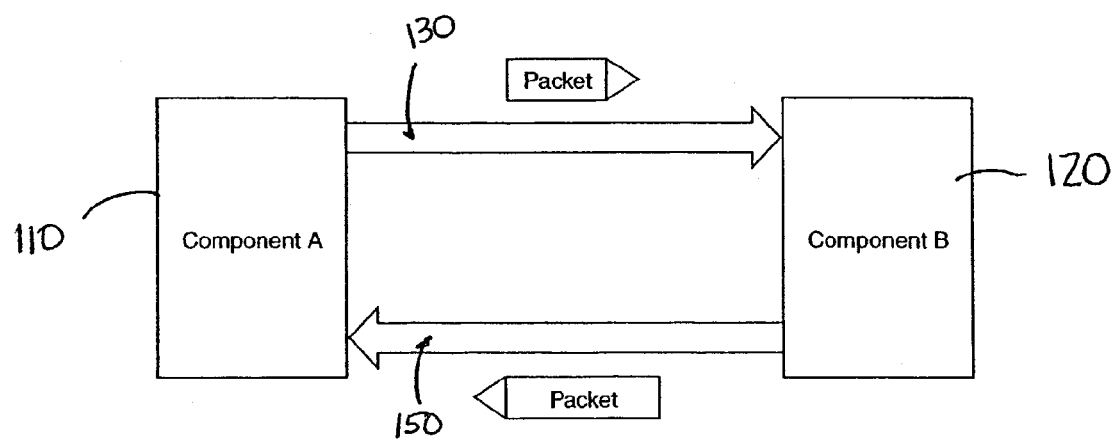
FIG. 1 is a block diagram of an arrangement in which the present invention can be used.

In the PCI Express™ architecture two electrical components can be coupled to one another via a dual-simplex communication channel. An example of such an arrangement is illustrated in FIG. 1. In this figure electrical element A 110 is connected to electrical element B 120 via what is referred to as a PCI Express™ link. The connecting link includes a transmit path from element A to element B, path 130, and a transmit path from element B to element A, path 150. Each of these individual transmit paths can be made up of a number of bit-serial lanes.

In some arrangements the link corresponds to a bus that is part of a system having an end point device coupled to a bridge which is in turn coupled to other peripheral devices. One such arrangement would include a graphical processing unit (GPU) as an end-point device and as such could correspond to element B of FIG. 1. In that circumstance, the bridge or root complex could correspond to element A of FIG. 1. The bridge could in turn be coupled to a central processing unit (CPU) and a memory that holds executable software instructions and/or data for processing. However, this is just one example of a potential use for this bus configuration.

The remainder of this specification will provide certain details about the operation of a PCI Express™ link. In connection with this description the present application hereby incorporates by reference co-pending application entitled, "Apparatus, System, and Method for Bus Link Width Optimization," by inventors Luc R. Bisson, Oren Rubinstein, Wei-Je Huang, and Michael B. Diamond, filed on the same date as the present application. That application provides a detailed description of the selectability of lanes among the possible lanes that constitute a link in a bus configuration and provides a description of how that might apply to the PCI Express™ architecture. Such a description as to the selectability of lanes and its applicability to the flexibility of the definition of a link can be incorporated with the power consumptive techniques of the present invention so as to appropriately place the respective portions of a link into the lowest possible power consumptive state while providing for as low latency as possible and reactivating components as necessary. In addition, a more detailed description of the PCI Express™ link architecture itself is provided in the PCI Express™ base specification revision 1.0a which is incorporated herein by reference.

Figure 2:
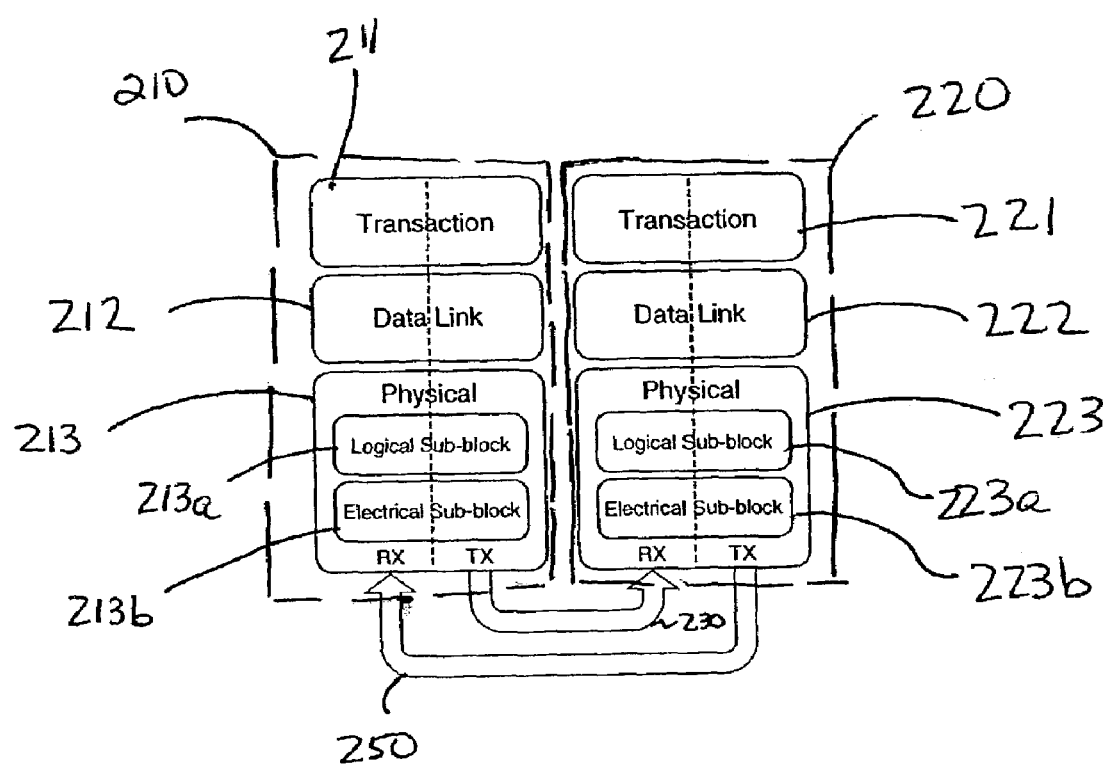
FIG. 2 is a schematic diagram of aspects of the arrangement of FIG. 1.

As illustrated in FIG. 2, each of the elements can be thought of as including three basic layers for its architecture, namely a transaction layer, a data link layer, and a physical layer. In FIG. 2, element A is shown as element 210 while element B is illustrated as element 220. It can be seen that the transmitter TX of component 210 is coupled to the receiver RX of element 220 via communications path 230. Furthermore, the transmitter of element 220 is coupled to the receiver RX of element 210 via communications path 250. In this architecture a basic link consists of a transmit path and a receive path. More specifically, the PCI Express™ link comprises dual unidirectional differential links that are implemented as a transmit pair and receive pair. A data clock is embedded using an encoding scheme to achieve high data rates. In each of the communication paths 230 and 250 there can be one or more lanes of communication. The present invention is particularly useful where there are multiple lanes selected for communication between the two components. Each lane represents a set of differential signal pairs (one pair for transmission, one pair for reception). It is possible to aggregate a plurality of lanes so as to selectively support different band widths with different link widths. The PCI Express™ specification provides a sufficient architecture to enable a link which consists of either one lane, two lanes, four lanes, eight lanes, twelve lanes, sixteen lanes, and thirty two lanes. As described in the co-pending application, the initiation of the communications between the elements and the set up for the lane width can be determined so as to appropriately allocate band width to the communications path between respective elements.

In this architecture the transaction layer, the upper layer of the architecture in the respective components, has the responsibility of assembling and disassembling transaction layer packets. Such packets are used to provide for the communication of certain transactions such as read, write, and other events. The middle layer is referred to as the data link layer. This forms a layer between the transaction and physical layer. The data link layer deals with such issues as data integrity. The third of these three layers is the physical layer. This physical layer provides all that is necessary in terms of operational circuitry to provide the appropriate interfaces for the links. As shown in FIG. 2 this physical layer can be thought of as constituted by two sub-blocks, a logical sub-block 213a and an electrical sub-block 213b. The logical sub-block can be considered to include the logical functions necessary to perform such operations as initialization and maintenance. The electrical sub-block includes such things as driver and input buffers, parallel to serial and serial to parallel converters and impedance matching circuitry. In transmitting information from one element to another the information is transmitted in packet form. These packets flow through the layers. In a transmit mode each layer can be thought of as an additional layer for packaging the packets created in the layer immediately above it in the hierarchy. Thus packets which might designate such functionality as a read operation or a write operation are encapsulated in the transaction layer and passed on to the data link layer where they are encapsulated in a further data link package or packet. Finally, the physical layer takes the data link layer package and further encapsulates it in a manner for its ultimate transmission over the link to the receiver of the other electrical element. In a receive mode the opposite flow occurs with each layer opening its respective package and sending what remains to the next highest layer.

The PCI Express™ link architecture allows for the link to be placed in a number of different power states that depend upon the activity level associated with the link. FIG. 3 captures a subset of the information about the available power states for links in the PCI Express™ link specification. As can be seen in FIG. 3, L0, L0s, and L1 are link states in which a link has different power states.

In the L0 state, the link is deemed to be fully active. As a consequence, the circuitry is in its highest power consumptive mode. As shown in the chart, the platform reference clocks are on and the platform main power is on. The L0 state is used by both power management that can be directed by software and by the active state power management (ASPM) capabilities outlined in the PCI Express™ specification.

A second power state where less power is consumed is denominated with the label L0s and is referred to as a standby state. In the PCI Express™ specification this standby state is used by the ASPM but not by software directed power management. In this state the device operates using less power as it waits for a triggering event to cause it to transition back to a fully active link state. This state is also referred to as a low resume latency, energy saving standby state. The device transitions from the L0 to the L0s state under the control of the active state power management. The L0s is a lower power state that is optimized for short entry and exit latencies while still providing substantial power savings. In the present bus specification the link is transitioned to an L0s state if certain non-active or idle conditions are met for a given time period. Thus, as the present invention is employed in other architectures the definition for what constitutes an inactive or idle state and the appropriate length of time for the existence of such idle characteristics can be varied so as to meet the power reduction designs appropriate for the components that are subject to control or management. In accordance with the PCI Express™ specification however, when the device is in the L0s state, it must initiate an exit from that state and then subsequently transition to the L0 state, that is the fully active state, to be able to resume transmission of data across the serial bus link. Thus, there must be some triggering event which permits the link to transition from an L0s state back to the L0 state.

Another reduced power state is referred to as the L1 state, which is a low power standby state. A device in this state consumes even less power than in the L0s state. In a tradeoff for even lower power consumption, the transition from an L1 state to an L0 state takes longer, that is there is a higher latency associated with a transition from L1 to L0. Even in the L1 state the PCI Express™ specification still requires that the platform power supplies and component reference clocks remain active. Entry into the L1 state can be triggered either by software directing power management functionality or by the active state power management capabilities associated with the bus. In either circumstance such a triggering indicates that the link is in less of a demand than the L0s state and that the increased latency encountered in transitioning from L1 to L0 is acceptable to obtain the appropriate power consumption reduction. The device will then transition from an L1 to an L0 power state either upon a triggering event such as the initiation of a transaction by either of the components coupled to the link.

As indicated above, the PCI Express™ link specification defines additional power states associated with the links. However, since this description of the links is merely being provided as an example for the implementation of the inventive arrangement of power management for multiple electrical components, such additional power states are not necessary to be understood to understand the present invention. Because of its broad applicability to power management schemes the present invention is not limited in use to only the L0s and L1 states of the PCI Express™ architecture. Easy reference to the specification may be had to have additional information about such power states.

According to the PCI Express™ link specification where there are multiple lanes associated with a given link and a link is placed into a given power consumption state (e.g., L0, L0s, L1) then all of the lanes associated with that link are also placed in that designated power consumption state. Thus where a link consists of N lanes of bit serial traffic, all of the lanes are also provided with that very same power consumption state designation.

In the PCI Express™ link configuration each lane of a multi-lane link is responsible for performing a transition from one power consumptive state to the next. This includes making each lane of a multi-lane link responsible for detecting state transitions, for example, from the L0s state back to the L0 state, or from the L1 state back to the L0 state. In prior implementations, this has required that each lane have associated therewith certain state transition detection circuitry. This state transition detection circuitry is enabled for each of the lanes when they are in the lower power states. As a consequence, the operation of each of these detectors, even in a low (e.g., L0s) or lower (e.g., L1) power consumptive state necessitates the consumption of power so as to be in the appropriate condition to recognize or detect a requested transition out of one of those lower power states to the active state.

In accordance with an embodiment of the present invention the link architecture can be modified to include the concept that where there are multiple detection circuits, each looking for a triggering or transition stimulating event, all but one of those detection circuits can be disabled this will further reduce power consumption in one of the lower power consumptive states. The sole remaining active or enabled state transition detector can then be used as the initial trigger detector. Upon detection of the triggering event, the first detector can produce an output which ultimately re-enables the state transition detectors associated with the other electrical components thereby allowing each of the components to detect the triggering event and thereby transition from the lower power state back to the active state. In the PCI Express™ link architecture this means that the state transition detector associated with one of the lanes would remain enabled while the state transition detectors for the remaining lanes of the multi-lane link could be disabled. When the state transition triggering event signal, that is some command or attempt to initiate communication, triggers the desire to transition to the L0 or active state, the enabled state transition detector identifies this triggering event. The detection of this event then is responded to by both transitioning the associated lane to the appropriate state and re-enabling the state transition detectors associated with the remaining lanes of the multi-lane PCI Express™ link. These re-enabled detection circuits then detect on their own the same triggering event, and then in turn transition their corresponding lane to the active or L0 power state.

Figure 4:
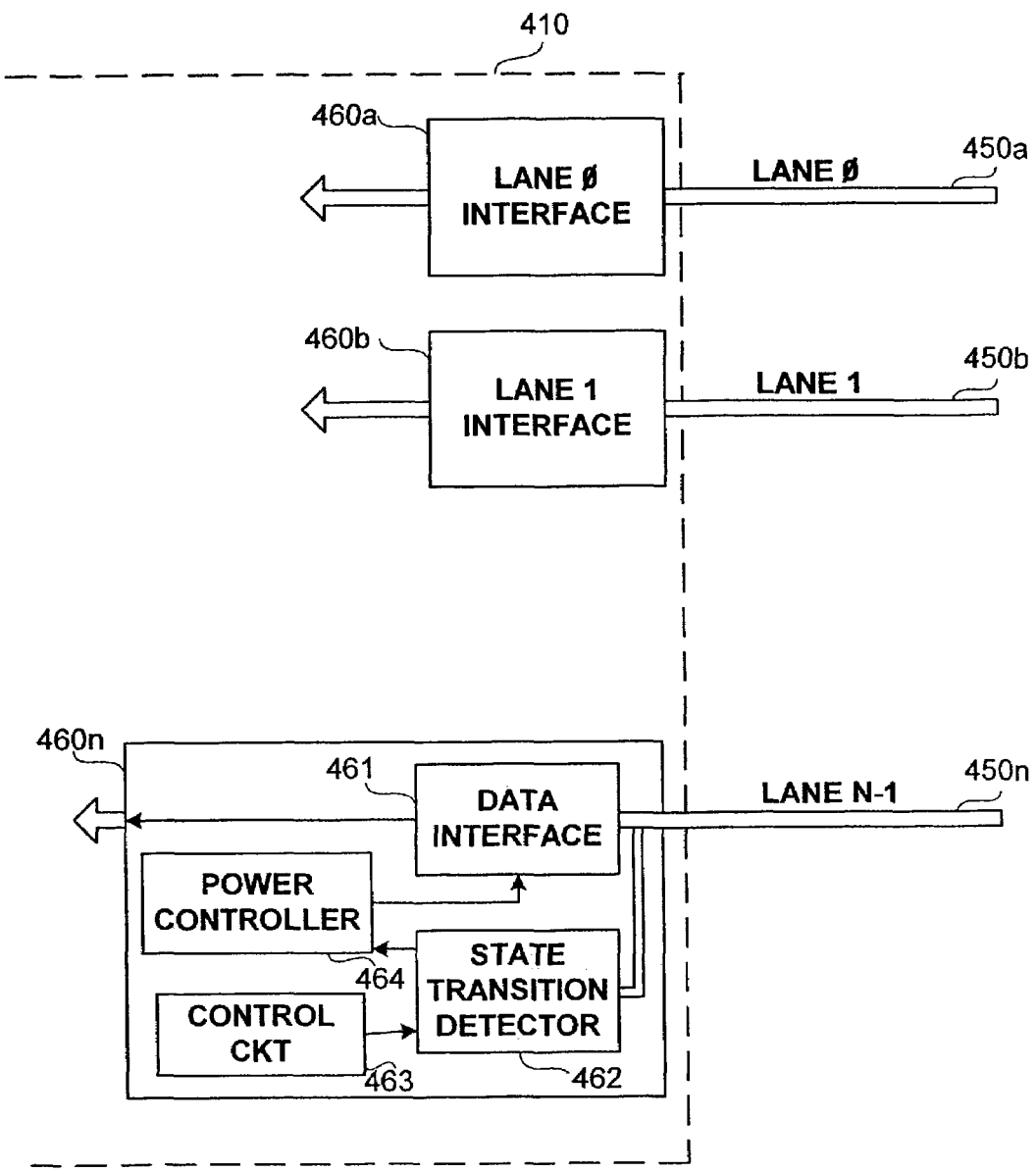
FIG. 4 is a block diagram of an embodiment of the present invention within the arrangement of FIG. 1.

FIG. 4 provides a schematic diagram of a potential implementation of the detector/power management arrangement which could be utilized in connection with a multi-lane serial bus configuration. Such an arrangement could be adapted to the PCI Express™ architecture and in particular to the electrical sub-block of the physical layer.

FIG. 4 illustrates a sub portion of an electrical element associated with the multi-lane serial bus link. This sub portion of component 410 focuses on the receive portions of lanes 0 through N−1. In addition are shown in schematic form 0 through N−1 as elements 450a through 450n. Element 410 can have a plurality of lane interface units 460a through 460n. These can also be thought of as the pads of the element or device. It should be recognized that while shown as separate interface units for purposes of this drawing the functionality of these various interface units might be incorporated in a single element each function being performed on each of the lanes associated with the multi-lane link.

Element 460n is illustrative of an example of functional blocks which could perform the necessary operations for a lane interface to permit the power savings attributable to the present invention. In this block diagram the lane is coupled to a data interface which can detect the data being transmitted over lane N−1. In the PCI Express™ architecture data is transmitted as a differential signal over the two wire lane N−1. The data interface 461 detects the potential difference between the two wires and attributes a data value to that differential signal. The potential difference on lane N−1 is also monitored by a state transition detector 462. In the PCI Express™ architecture such a state transition detector is used when the lane has been placed in either an L0s or L1 state. The potential difference on lane N−1 is indicative of the state in which it resides. The state transition detector is used to detect a change in the potential difference on the lane. When in the L0s or L1 state, the data interface can be deactivated or operated in a reduced power manner because data is not anticipated to appear on lane N−1. This operation can be done under the control of power controller 464. When the state transition detector detects that data transmission is being initiated to the device via lane N−1, or otherwise detects a control signal to reactivate the interface, it will advise the power controller of that occurrence at which point the power controller can reactivate the data interface. As can be seen, since each of the lane interfaces could incorporate similar circuitry, and under the specification each lane interface would be responsible for detecting a state transition from a lower power state to an active state, then while in a low power state all of the state transition detectors might remain active. Unless modified, each detector would consume power while it awaits receipt of a triggering event or signal to effect a transition from a lower power state to an active state. In accordance with an embodiment of the present invention the lane interface circuitry can include control circuitry 463 also coupled to the state transition detector so as to reduce the power consumption. This control circuitry acts to disable the state transition detector where the lane is one lane in a multi-lane link so long as there is at least one of the lanes in the multi-lane link which has its state transition detector enabled. Thus for instance in an eight lane link configuration it would be possible using control circuitry in each of the lane interfaces for the eight lanes, to disable the state transition detectors in seven of the eight lanes, leaving one lane state transition detector enabled. The state transition detector that is enabled would then detect the occurrence of the triggering event and signal the power controller to restore the power state to the L0 or active state for the lane with which it is associated. At the same time as triggering the shift from a lower power state to a high power state in connection with the lane that actually detects the transition request, the state transition detectors in each of the remaining seven lanes are re-enabled. In that circumstance, the re-enabled state transition detectors in the other seven lanes would then also detect the transition signal or triggering signal event which would in turn cause the power controller associated with that lane to restore or reactivate the data interface thereby transitioning from the lower power state to the higher power states or in this instance active state L0.

Thus the arrangement of FIG. 4 provides a scheme for further reducing power consumption where there are a plurality of components which are each looking to the occurrence of the same or similar triggering event as a transitioning event from a lower power state to a high power state. In this circumstance the additional power savings arise because rather than using all of the state transition detectors which are disposed along the various lanes of the multi-lane link, the present invention provides an embodiment in which only one state transition detector need be enabled to recognize the occurrence of the triggering event after which time the remaining state transition detectors can be activated and in turn recognize the event so as to initiate a power state transition from a lower power state to a higher power state. As a consequence there are additional power savings with the inactivation or disabling of the state transition detector 462. It should be appreciated by those skilled in the art that design choices could be made to have more than one of the state transition detectors enabled and fewer than N−1 detectors disabled. The appropriate ratio of enabled to disabled detectors can be selected based on the environment in which the invention is used.

Figure 5:
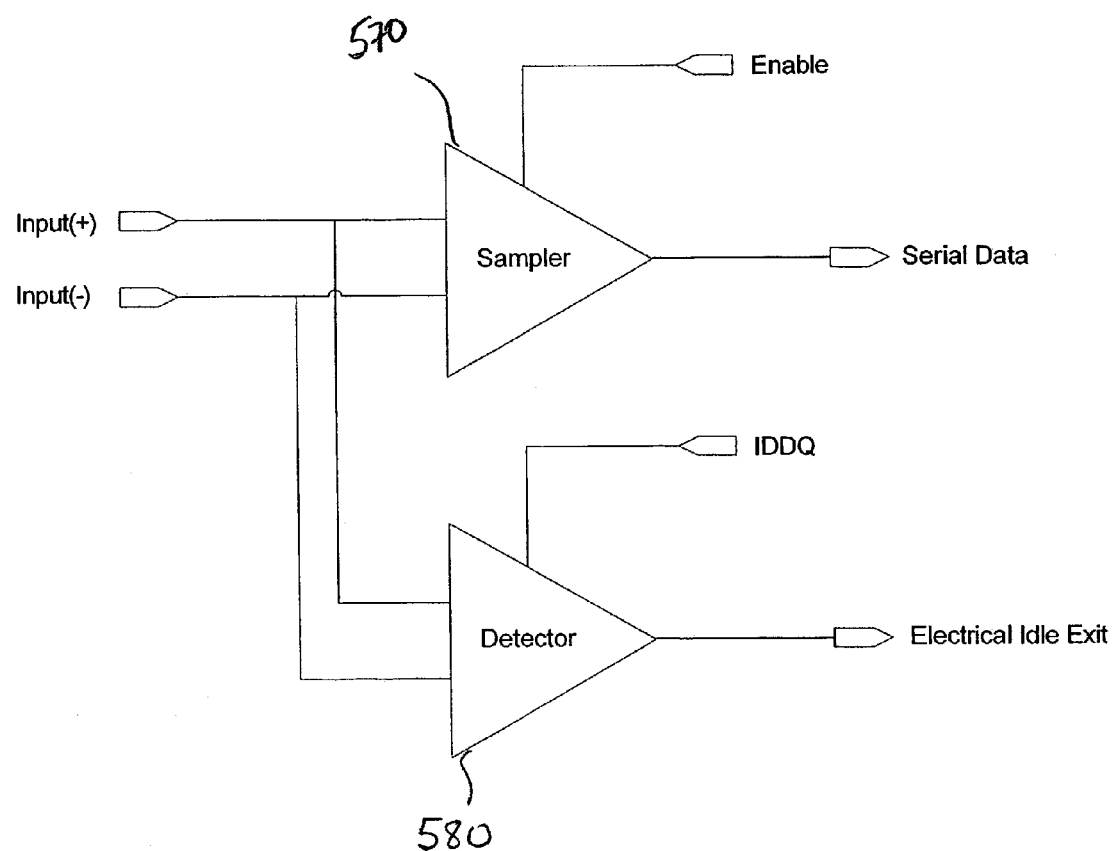
FIG. 5 is a block diagram of another embodiment of the present invention which can be used in the arrangement of FIG. 1.

FIG. 5 illustrates an example of circuitry that might be deployed in connection with an implementation of the present invention in the PCI Express™ architecture. As illustrated in FIG. 5 a sampler 570 receives the differential inputs in connection with a given lane of the multi-lane link. When enabled this sampler detects the potential difference between the two input lines and provides as an output the serial data. In a reduced power state, the sampler can be disabled such that the sampler no longer consumes power. In this arrangement, detector 580 is also coupled to the differential input lines. The job of detector 580 is to detect a signal appearing on a differential input lines, which signal is indicative of the desire to transition out of a low power state. In particular, as shown in FIG. 5 the detector will provide an indication that the system is to transition from an electrical idle state, that is, it is to exit what is referred to in the PCI Express™ architecture as the electrical idle state. Typically one of these detectors is associated with the differential inputs for a given lane of the multi-lane link. Therefore there would be a separate detector for each of the multiple lanes. In the absence of the present invention, each detector would be consuming power as it awaits some trigger signal or transition indicator along the differential inputs of the lane. In accordance with an embodiment of the invention, however, all of the lanes with the exception of one would have a signal applied to the detector in this instance, the IDDQ signal of FIG. 5, whereby the detector is actually disabled for those lanes. The detector remains disabled until the detector with the lone operational detector actually detects the existence of the triggering event. At the occurrence of the triggering event as detected by one of the multiple lanes, the IDDQ signals applied to the detectors for the other lanes are removed, thereby re-enabling the detectors 580 associated with respective multiple lanes. Then those re-enabled state transition detectors would detect the triggering event appearing on their respective differential inputs and then provide a corresponding electrical idle exit for each of their lanes. Each lane could then transition from its low power state to a higher powered state.

The IDDQ signal referred to in the embodiment in FIG. 5 relates to test circuitry which is already supplied on the device in connection with pre-release testing to make sure that leakage current characteristics of the device are within an acceptable range. This is a test applied to the device to look for leakage current with all of the elements on the device turned off. This chip or device test can show a flaw when there is leakage current detected. To perform this leakage current test, a signal is applied (IDDQ) that puts the device in quiescent mode. In essence this IDDQ signal shuts down all of the circuitry associated with the pad that is coupled to the lane in question. Thus the IDDQ signal can be used to turn off the entire pad in this power saving mode as well. The IDDQ signal disables the detector just as it does when in leakage current test mode. As a consequence the detector and other pad circuitry consume virtually no power. Once the IDDQ signal is removed however, the pad circuitry is no longer shut down and the detector is re-enabled, that is it returns to its operational state of detecting triggering events along the associated lane. While the application of the IDDQ signal requires the application of an active signal, any resultant energy consumption is minimal and in essence corresponds to that caused by any existing leakage current.

Figure 6:
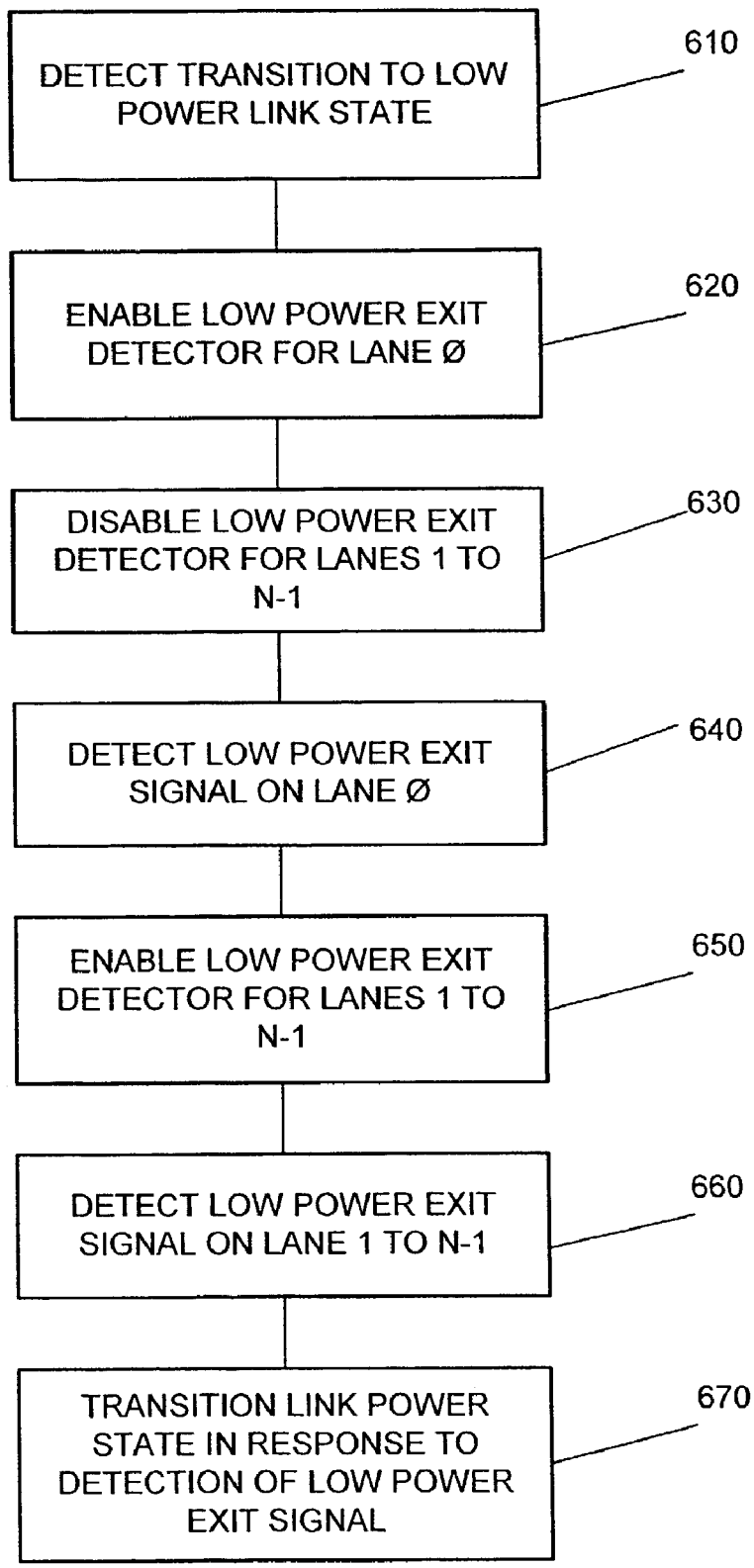
FIG. 6 is a process flow diagram for using the present invention in the arrangement of FIG. 1.

FIG. 6 provides an illustration of the timing flow for an implementation of the power consumption control technique in a PCI Express™ architecture. In accordance with the first step in the time flow there is a detection of a transition to a low power link state, 610. This could correspond to a software driven power management shift or a shift necessitated by the active state power management capabilities in the architecture causing a transition from an L0 active state to some lower power idle state. Once the transition to a low power link state is detected then one of the lanes, for example lane 0 has its low power exit detector enabled. In the example of FIG. 5 this would correspond to enabling the detector 580 for detecting some signal indicative of a transition out of the low power state. In addition to enabling the low power exit detector for one of the lanes the remaining lanes can have their low power exit detector disabled. These two functions 620 and 630 could happen in reverse order to that set forth in the figure or they could happen nearly simultaneously with one another. The order in which they occur is not critical to the application of the invention. In addition, it is not a requirement of the system that one and only one of the detectors be enabled with all remaining detectors being disabled. A design choice could be made whereby one or more of the detectors could be enabled while one or more of the detectors of the multiple lanes are disabled.

When in the example of FIG. 6 the detector of lane 0 detects a low power exit signal on that lane, the other disabled low power exit detectors for the other lanes are subsequently enabled, 650. This makes them available to also detect low power exit signals on their respective lanes, 660. In response to the signal to transition from a low power state the link is caused to transition its power state from a low power state to an active state, 670.

The present invention provides for the further control of power state transitions among a plurality of electrical components each looking for the occurrence of one or more certain triggering events that would otherwise initiate a transition from one power state to another. While the present invention has been described with more particularity in an exemplative manner with regard to the architecture for the PCI Express™ serial bus configuration, it would be appreciated by those skilled in the art that the present invention could also be applied in other contexts where there are a plurality of electrical components which are to be operated in different power states. The present invention provides the capability that where the plurality of electrical components are to transition between respective states it is unnecessary to activate the trigger detection capabilities in each of these individual electrical components when a single component can instead detect the triggering event and then enable the detection apparatus associated with each of the other electrical components. Thus the shutting down of the additional electrical components provides further power savings in these various other contexts. In another application or prospective use of the invention it is conceivable that a complex network arrangement can include multiple processors that are connected to one another via links such as a single lane PCI Express™ link. In this scenario the control of each of the links could be tied together such that one single lane link could be used as the transition detector for all of the other links between the various processors, and all of those other links can be either single lane or multi-lane links. Thus the present invention scales to various arrangements where there are multiple components all residing in a given state and all looking for a triggering event that will effect a transition to another power state.

What is claimed is:

1. An apparatus for controlling a power state of a multi-lane serial bus link having a plurality of power states, the apparatus comprising:
    a plurality of lane interface units for a plurality of serial data lanes of said serial bus link;
    leakage current test circuitry configured to place selected circuits into a quiescent mode for leakage current testing;
    a plurality of state transition detection circuits, each one of said plurality of state transition detection circuits being associated with one of said plurality of lane interface units and being adapted to detect information indicative of whether its associated lane is to transition out of a particular power consumptive state, said plurality of state transition detection circuits coupled to a portion of said leakage test circuitry,
    wherein a subset of said state transition circuits are adapted to be disabled by said leakage current test circuitry in a power savings mode with at least one state transition circuit remaining operative as a trigger detector to monitor for subsequent state transition control signals on the behalf of said subset of state transition circuits.

2. The apparatus of claim 1 wherein at least one of said plurality of state transition detectors includes a differential voltage sensor, said sensor having a control terminal; and
    said sensor control terminal being coupled to said leakage current test circuitry.

3. The apparatus of claim 1 wherein said leakage current test circuitry includes a quiescent mode signal generator, said sensor control terminal receiving a signal based on an output of said quiescent mode signal generator.

4. The apparatus of claim 1 wherein said leakage current test circuitry includes a quiescent mode signal generator.

5. An apparatus for reducing power consumption in a power savings mode on a multi-lane serial bus link having a plurality of power states, comprising:
    a plurality of lane interface units for a plurality of serial lanes, each lane interface unit coupled to an associated pad;
    a plurality of power state transition detectors, each detector associated with one of the pads;
    control circuit coupled to said plurality of power state transition detectors such that when said plurality of pads are in a first power state there is a power state transition detector for one of said pads that is active and there is a power state transition detection for another of said pads that is inactive.

6. The apparatus of claim 5 wherein at least one of said plurality of power transition devices includes a differential voltage sensor having inputs for detecting a potential difference along a lane of multi-lane communication path.

7. The apparatus of claim 5 wherein said first power state corresponds to a detected level of inactivity of said plurality of pads and said enabled power state transition detector is capable of detecting a triggering event that drives the associated pad to a more active state.

8. A method for controlling power in a power savings mode along a communication link having a plurality of serial lanes configured as a bus having a plurality of power states, with each serial lane having an associated state change detector to monitor state transitions of said link, the method comprising:
 receiving a state transition control signal for the communication link; and
 placing the communication link in a first power state in response to the received state transition control signal, wherein said placing includes,
  enabling a first state change detector associated with a pad coupled to a first one of said plurality of lanes; and
  disabling a second state change detector associated with a pad coupled to a second one of said plurality of lanes;
 and utilizing said first state change detector as a trigger detector to monitor for subsequent state transition control signals on the behalf of said first lane and said second lane.

9. The method of claim 8, further comprising:
 detecting a power state change with said first state change detector;
 in response to said first state change detector detecting a power state change enabling said second state change detector.

10. A method for controlling power consumption in a power savings mode along a multi-lane serial bus link between two data communication elements having a plurality of power states, the method comprising:
 receiving via the serial bus link, a state transition signal at a first element having multiple pads to interface with serial data lanes of said serial bus link;
 controlling a first one of said multiple pads to enter a first reduced power state responsive to said state transition signal;
 controlling a second one of said multiple pads in response to said state transition signal to enter a second reduced power state that consumes less power then said first reduced power state wherein said first and second pads are simultaneously in two different reduced power states with said first pad in said first reduced power state operative to monitor subsequent state transition signals received via said serial bus link and said second pad in said second reduced power state being inoperative to monitor subsequent state transition signals received via said serial bus link; and
 utilizing said first pad to monitor said serial bus link for subsequent state transition signals on the behalf of said second pad.

11. The method of claim 10 wherein said controlling a first one of said multiple pads includes enabling a power state transition detector associated with said first one of said multiple pads.

12. The method of claim 11 wherein said controlling a second one of said multiple pads includes disabling a power state transition detector associated with said second one of said multiple pads.

13. The method of claim 12 wherein disabling comprises activating a quiescent current test circuit.

14. The method of claim 12, further comprising:
 detecting, with said power state transition detector associated with said first one of said multiple pads, a signal indicating a change out of said first reduced power state; and
 upon detecting, enabling said power state transition detector associated with said second one of said multiple pads.

15. The method of claim 14 wherein upon enabling said power state transition detector associated with said second one of said multiple pads said second lane enters said first reduced power state.

16. The method of claim 15, further comprising:
 upon enabling said power state transition detector associated with said second one of said multiple lanes, detecting a change out of said first reduced power state.

17. The apparatus of claim 5, further comprising:
 a plurality of idle detection circuits being associated with one of said plurality of lanes;
 a power controller coupled to said receiver and said plurality of idle detection circuits, and adapted to activate at least one of said plurality of idle detection circuits and to turn off at least another one of said plurality of idle detection circuits in response to a first power state transition signal.

* * * * *